(12) United States Patent
Matuschek et al.

(10) Patent No.: US 8,632,108 B2
(45) Date of Patent: Jan. 21, 2014

(54) CRASH BOX

(71) Applicant: GM Global Technology Operations LLC, Detroit, MI (US)

(72) Inventors: Jens Matuschek, Ruesselsheim (DE); Uwe Eckert, Bischofsheim (DE); Roland Schirmer, Frankfurt (DE); Bardo Braunbeck, Oppenheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/670,507

(22) Filed: Nov. 7, 2012

(65) Prior Publication Data
US 2013/0119705 A1  May 16, 2013

(30) Foreign Application Priority Data

Nov. 8, 2011  (DE) .......................... 10 2011 117 933

(51) Int. Cl.
*B60R 19/34* (2006.01)

(52) U.S. Cl.
USPC ........................ 293/133; 293/155; 296/187.09

(58) Field of Classification Search
USPC ........ 293/132, 133, 155; 296/187.09, 187.11, 296/203.02, 187.03
See application file for complete search history.

(56) References Cited

U.S. PATENT DOCUMENTS

| | | | |
|---|---|---|---|
| 7,188,877 B2 | 3/2007 | Gonzalez et al. | |
| 7,677,617 B2 * | 3/2010 | Stewart et al. | 293/133 |
| 8,047,588 B2 | 11/2011 | Fang et al. | |
| 2006/0033363 A1 | 2/2006 | Hillekes et al. | |
| 2008/0079273 A1 * | 4/2008 | Patel et al. | 293/133 |
| 2008/0106107 A1 * | 5/2008 | Tan et al. | 293/133 |
| 2008/0238142 A1 * | 10/2008 | Braunbeck et al. | 296/187.03 |
| 2009/0243313 A1 * | 10/2009 | Handing et al. | 293/133 |
| 2010/0019518 A1 * | 1/2010 | Stewart et al. | 293/133 |
| 2010/0148527 A1 * | 6/2010 | Frank | 293/155 |
| 2010/0230983 A1 * | 9/2010 | Braunbeck et al. | 293/133 |
| 2012/0146348 A1 * | 6/2012 | Di Modugno | 293/133 |
| 2012/0228890 A1 * | 9/2012 | Frank | 293/155 |
| 2012/0267908 A1 * | 10/2012 | Kokubo et al. | 293/133 |
| 2013/0057000 A1 * | 3/2013 | Patschicke et al. | 293/133 |
| 2013/0076051 A1 * | 3/2013 | Baldwin | 293/133 |
| 2013/0119682 A1 * | 5/2013 | Matuschek et al. | 293/133 |
| 2013/0119705 A1 * | 5/2013 | Matuschek et al. | 296/187.03 |

FOREIGN PATENT DOCUMENTS

| | | |
|---|---|---|
| DE | 102004032545 A1 | 2/2006 |
| DE | 102005051764 A1 | 5/2007 |
| DE | 102008032543 A1 | 4/2009 |
| JP | 2001171447 A | 6/2001 |

OTHER PUBLICATIONS

German Patent Office, German Search Report for Application No. 102011117933.3, dated Jul. 18, 2012.

* cited by examiner

*Primary Examiner* — Glenn Dayoan
*Assistant Examiner* — Gregory Blankenship
(74) *Attorney, Agent, or Firm* — Ingrassia Fisher & Lorenz, P.C.

(57) ABSTRACT

A crash box for arrangement between a bumper and a longitudinal beam of a motor vehicle body is provided. The crash box is able to be arranged with a fastening profile at least partially overlapping to a mount profile of the longitudinal beam. The crash box has a support element, which penetrates the fastening profile transversely to its profile longitudinal direction (x) and is able to be brought into abutment in a supporting manner with an end section of the mount profile.

18 Claims, 3 Drawing Sheets

A-A

CRASH BOX

CROSS-REFERENCE TO RELATED APPLICATION

This application claims priority to German Patent Application No. 10 2011 117 933.3, filed Nov. 8, 2011, which is incorporated herein by reference in its entirety.

TECHNICAL FIELD

The present disclosure relates to a crash box for arrangement between a bumper and a longitudinal beam of a motor vehicle body.

BACKGROUND

Crash boxes function as impact energy absorbing elements which are arranged between a bumper, in particular a bumper transverse beam, and a longitudinal beam of a motor vehicle body, in order to be able to largely prevent damage to the supporting structure of the body in the case of a front or rear impact in the lower speed range. Known crash boxes are generally constructed as thin-walled, approximately rectangular-cubic elements of steel, aluminum or plastic. They can be produced by joining from pressed sheet metal shells or in one piece, for example as an extrusion-molded or respectively extruded aluminum profile.

A mechanical impulse or a corresponding kinetic energy acting in the case of load on the bumper or respectively on the bumper transverse beam, on exceeding predetermined thresholds can lead to a targeted deformation of the crash box which is constructed as an energy absorption unit, and in so doing can largely protect the longitudinal beam of the vehicle body adjoining the crash box from damage.

The most varied of ways exist for fastening crash boxes on the longitudinal beam. So-called stick-in fastening concepts make provision, for example, to insert the crash box with a fastening profile facing the longitudinal beam into the profile cross-section of the associated longitudinal beam at least in parts, and in so doing to connect with one another, preferably detachably, overlapping profile regions of crash box and longitudinal beam which come directly to abutment, for instance to screw them to one another.

Thus, for example from DE 10 2005 051 764 B4 a crash box is known which is divided into two sections, which has a fastening section engaging into the longitudinal beam and a deformation section arranged before the front face of the longitudinal beam. The deformation section is composed here of an upper and a lower half shell, which in the case of a construction made of metal are connected with one another by welding. As a further component, that crash box has a flange plate with a restructuring formed thereon in one piece, which forms the fastening section engaging into the longitudinal beam. In terms of assembly technology, a pre-assembled crash box is introduced into the longitudinal beam, until the flange plate comes to abut against a front flange of the longitudinal beam, constructed in a corresponding manner hereto.

Such a crash box has a relatively complex construction and requires a separate reciprocal fastening or joining of fastening section and deformation section.

Alongside this, in the case of screwed stick-in fastenings, comparatively high point loads may occur in the region of the screws and screw holes. So that some stability can be provided, such screws and screw bolts and fastening holes corresponding herewith may be constructed so as to be sufficiently stable and thick-walled.

Accordingly, it may be desirable to provide a crash box which has an improved behavior transferring force and impact energy with regard to an introduction of force or energy into an adjoining longitudinal beam. It is also desirable to provide a crash box that is able to be produced at a lower cost, in a space-saving manner and is simple to install. Further, it is desirable to provide a crash box with a reduced weight. In addition, other objects, desirable features and characteristics will become apparent from the subsequent summary and detailed description, and the appended claims, taken in conjunction with the accompanying drawings and this background.

SUMMARY

According to various aspects of the present disclosure, a crash box is provided for arrangement between a bumper, in one example, a bumper transverse beam, and a longitudinal beam of a motor vehicle body. The crash box includes a fastening profile which is able to be arranged at least partially overlapping to a mount profile of the longitudinal beam. With an overlapping arrangement in one example, a stick-in assembly solution is intended, in which the profile section of the crash box, facing the longitudinal beam, viewed in circumferential direction, is able to be inserted or pushed completely into a corresponding mount profile of the longitudinal beam.

The profiles which are coordinated reciprocally with one another, namely the fastening profile of the crash box and the mount profile of the longitudinal beam, are configured herein such that the profiles come to abut almost directly against one another with at least two opposite side walls, and there, for instance by means of one or more fastening means penetrating the overlapping profiles in the profile transverse direction, are thus able to be connected detachably with one another, for instance by means of a screw bolt.

In one exemplary embodiment, the crash box of the present disclosure has in addition at least one support element which penetrates the fastening profile of the crash box transversely to its profile longitudinal direction and is able to be brought to abutment in a supporting manner with an end section of the mount profile. Viewed in the profile transverse direction, the at least one support element of the crash box projects beyond the cross-section of the mount profile of the longitudinal beam, so that it can come to abut in a directly supporting abutment position with a free end section of the longitudinal beam profile facing the crash box.

Any deformation forces acting in the profile longitudinal direction onto the crash box can therefore be diverted via the support element comparatively over a large area and uniformly into the profile cross-section of the adjoining longitudinal beam. The crash box therefore no longer rests exclusively in a punctiform manner in the region of screw connections, but via a support element, projecting laterally beyond the free end of the profile cross-section of the longitudinal beam on it.

Punctiform loads, as otherwise occur in the region of a screw connection of crash box and longitudinal beam in the case of load, can therefore be reduced in a targeted manner. It is even conceivable here to reduce the fastening screws and wall thicknesses of the wall sections of the crash box receiving the screws with regard to their dimensions and mechanical load requirements, so that they only still fulfill a function holding or respectively supporting the crash box on the longitudinal beam. A supporting of forces acting in the profile longitudinal direction on the bumper and crash box can be provided almost completely here via the supporting in profile longitudinal direction which is able to be achieved by means of the support element.

According to one exemplary embodiment, the support element is constructed as a support plate which projects respectively from opposite side walls of the fastening profile of the crash box. The support element or respectively the support plate therefore penetrates the entire fastening profile of the crash box in the profile transverse direction. Generally, the surface normal of the support plate extends substantially parallel to the profile longitudinal direction of the fastening profile.

In one example, the opposite side walls of the fastening profile have through-openings, aligned to one another, to receive the support plate. In terms of manufacturing technique, the crash box can be provided with its fastening profile for example as an extrusion-molded or extrusion component, which is provided on side walls lying opposite in the profile transverse direction with through-openings coordinated with the dimensions of the support plate. The support plate can then be pushed in profile transverse direction through the two through-openings of the side walls, which are aligned to one another, and can be connected with the fastening profile, for example welded. The connecting of support plate and fastening profile can serve here merely as a retainer.

A support in the profile longitudinal direction can be provided by accurately-fitting insertion of the support plate into the fastening profile of the crash box, in so far as the free ends of the support plate project sufficiently far from the opposite side walls of the fastening profile, which are penetrated by the support plate, in order to come into abutment against a longitudinal beam profile edge on inserting into an associated longitudinal beam profile.

According to another exemplary embodiment, the fastening profile has in the region of at least one side wall at least one through-opening, which in the installation position comes to lie with the longitudinal beam aligned to at least one through-opening of the longitudinal beam constructed in a corresponding manner hereto or respectively arranged aligned hereto. By the fastening profile of the crash box and the mount profile of the longitudinal beam having through-openings constructed aligned to one another, the fastening profile, therefore the crash box, can be connected in a simple manner with the longitudinal beam, generally detachably.

According to another exemplary embodiment, the support plate lying in the profile cross-section of the fastening profile takes up at least about 50%, generally about 75%, in one example, at least about 80% or a proportion generally exceeding this of the cross-sectional area of the fastening profile. In accordance with the size of the support plate, the generally outwardly projecting support elements of the plate also extend from the profile cross-section, so that on reaching a final assembly configuration, the support elements running laterally or respectively in the profile transverse direction can come to abutment over as large an area as possible with an end section of the mount profile of the longitudinal beam.

Any punctual stresses can be largely prevented hereby, and the mechanical energy occurring in the case of load can be introduced as evenly distributed as possible into the longitudinal beam, so that the latter can withstand much higher stresses largely unscathed. In addition, through the fastening of crash box and longitudinal beam, compared with a reciprocal one based purely on screw bolts or screws, the energy absorption behavior of the crash box as a whole can be improved. The crash box undergoes a support which is much more resilient and over a larger area on the longitudinal beam and can therefore receive much higher energies and forces.

It is even conceivable to reduce the geometry of the crash box, in order to hereby save installation space in the motor vehicle, or respectively to reduce the overall dimensions of the vehicle.

According to another exemplary embodiment, a side wall of the fastening profile of the crash box continues seamlessly into a side wall of an energy absorption profile of the crash box adjoining the fastening profile. The side walls of fastening profile and energy absorption profile can be constructed in one piece, wherein the regions of fastening profile and energy absorption profile of the crash box are separated from one another structurally by the position or respectively arrangement of the support plate, or respectively of the at least one support element. The energy absorption profile here is the region of the crash box which projects from the longitudinal beam end in the assembly position of the crash box on the longitudinal beam.

An exemplary continuous embodiment of the side walls of fastening profile and the energy absorption profile adjoining hereto in the profile longitudinal direction enables a largely one-piece embodiment of the crash box, for instance in the form of an extrusion- or extruded profile.

According to another exemplary embodiment, at least in the region of the energy absorption profile at least one profile wall is provided, connecting opposite and outer side walls of the energy absorption profile with one another. The at least one profile wall also extends in the profile longitudinal direction within the cross-section of the energy absorption profile and adjoins the inner sides of the opposite side walls of the energy absorption profile. The at least one profile wall divides the energy absorption profile into several chambers. The structural rigidity and deformability of the energy absorption profile can be altered in a targeted manner with the at least one profile wall.

In another exemplary embodiment, the inner profile wall of the energy absorption profile, viewed in the profile longitudinal direction (x), adjoins the support plate. The inner profile wall and support plate can, but do not have to, come into immediate abutting connection with one another. Between the inner profile wall and the support plate, viewed in the profile longitudinal direction, at least one clearance can be formed, which is eliminated only on occurrence of deformations, for instance in the case of load.

According to another exemplary embodiment, the fastening profile and the energy absorption profile are constructed in one piece as an extruded profile, wherein the fastening profile has an inner cross-section free of profile wall. The fastening profile has in this respect only side walls forming the outer contour of the crash box. The fastening profile is constructed so as to be closed here, viewed in circumferential direction, as it were as a hollow profile, but has in the region of its inner cross-section no further structure-stabilizing profile walls, constructed for instance as transverse webs.

From the point of view of manufacturing technique, provision is made here in one example to provide the entire crash box firstly as a single-piece extruded profile and subsequently in the region of the fastening profile to cut out any inner profile walls or connecting webs which may be present. Then, in the transition region between the energy absorption profile and the fastening profile, opposite through-openings would be provided for the support plate in the exterior side walls of the crash box, in order to finally push the support plate through the through-openings which are aligned to one another.

According to another exemplary embodiment, the crash box is constructed as an aluminum extrusion. This applies both to the energy absorption profile and also to the fastening profile adjoining hereto. In addition, the support plate is also generally constructed as an aluminum plate, which in the transition between the energy absorption profile and the fastening profile is connected, generally welded, to the exterior side walls of the crash box.

Alternatively hereto, provision may of course be made to manufacture the crash box from another metal, for instance from steel. Here, the energy absorption profile and the adjoining fastening profile can likewise be constructed largely in a single piece. Instead of an extrusion, in the case of a crash box manufactured from sheet steel, also two or more half shells can be connected with one another by material connection, in one example welded to one another, in order to form a closed hollow profile adapted to the longitudinal beam geometry.

According to another exemplary embodiment, in addition a motor vehicle body is provided with at least one longitudinal beam, generally with two longitudinal beams spaced apart from one another in the vehicle transverse direction (y), running substantially parallel to one another, wherein on an end on the longitudinal side of the at least one longitudinal beam, at least one previously described crash box is arranged. The at least one crash box is fastened here with a fastening profile at least partially overlapping on a mount profile of the longitudinal beam constructed in a corresponding manner hereto. In addition, at least one support element, extending transversely to the fastening profile, rests on the end section of the mount profile of the longitudinal beam, facing the crash box, in the profile longitudinal direction (x) on the longitudinal beam.

The support element and end section of the longitudinal beam do not necessarily have to be in a direct abutment position with one another. The crash box can be fastened on the longitudinal beam, maintaining a predetermined clearance between the support element and end section of the mount profile on the longitudinal beam side. At the latest on the occurrence of an application of force onto the crash box, lying above a threshold value, the support element of the crash box comes with the mount profile of the longitudinal beam in direct and supporting abutting position, so that a corresponding supporting effect can be provided. Although a reciprocal arrangement of crash box and longitudinal beam is possible, with a maintaining of a predetermined clearance between the mount profile and support element, however a direct reciprocal abutting position of the support element on the crash box side on the longitudinal beam end proves to be advantageous.

According to another exemplary embodiment, the mount profile of the longitudinal beam and the fastening profile of the crash box have through-openings which are aligned to one another and are able to be penetrated by a fastening element, for instance by a screw bolt. At least one of the through-openings of a profile can have a weld nut or suchlike fastening means on the side facing away from the other profile, in order for example to receive a screw bolt or a corresponding screw, penetrating the through-openings which are aligned to one another.

Following all the foregoing, according to another one of various aspects of the present disclosure, a motor vehicle is provided, which has a previously described motor vehicle body or respectively at least one previously described crash box. In addition, it is to be noted that all the features, advantages and effects named with respect to the crash box have equal validity for the motor vehicle body and also for the motor vehicle, and vice versa.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
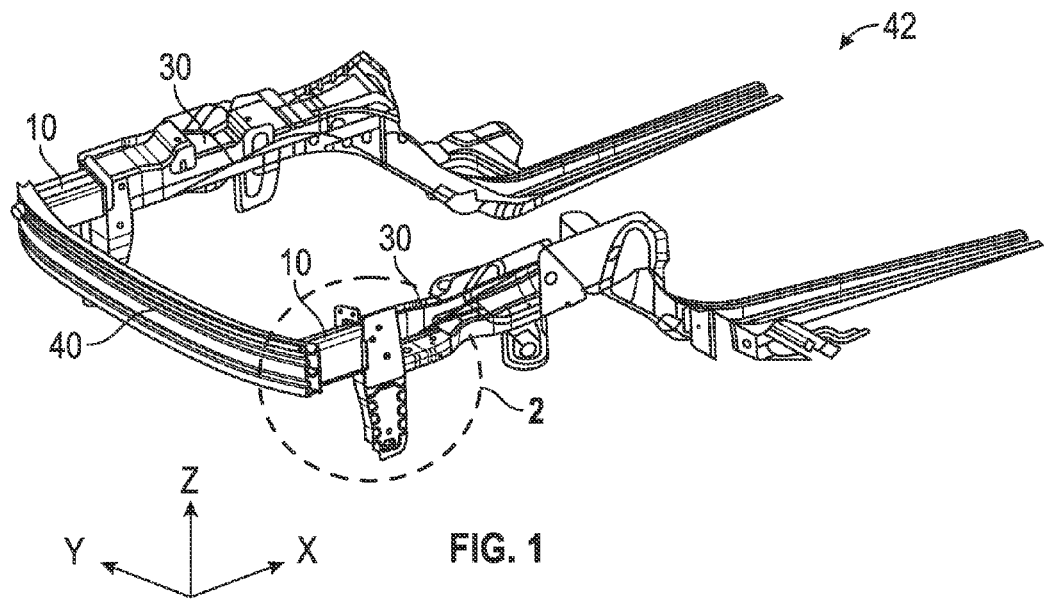
FIG. 1 is a perspective illustration of a longitudinal beam structure of a motor vehicle body.

The motor vehicle body 42 shown in part in perspective illustration in FIG. 1 has two longitudinal beams 30 extending substantially in the vehicle longitudinal direction (x), on the end section of which, facing the observer, respectively a crash box 10 is detachably fastened. At the other end of the crash box 10, a bumper 40 is arranged, which in one example in the case of a frontal or rear impact of the motor vehicle, which is not shown here explicitly, receives a corresponding impact energy and introduces it into the crash boxes 10.

Below a predetermined threshold value of impact energy or mechanical load, the longitudinal beams 30 of the body 42, adjoining the crash boxes 10, can therefore be extensively protected from deformations and hence from damage. The kinetic energy and/or impact energy can be largely absorbed in this respect by targeted deformation of the crash boxes 10.

Figure 2:
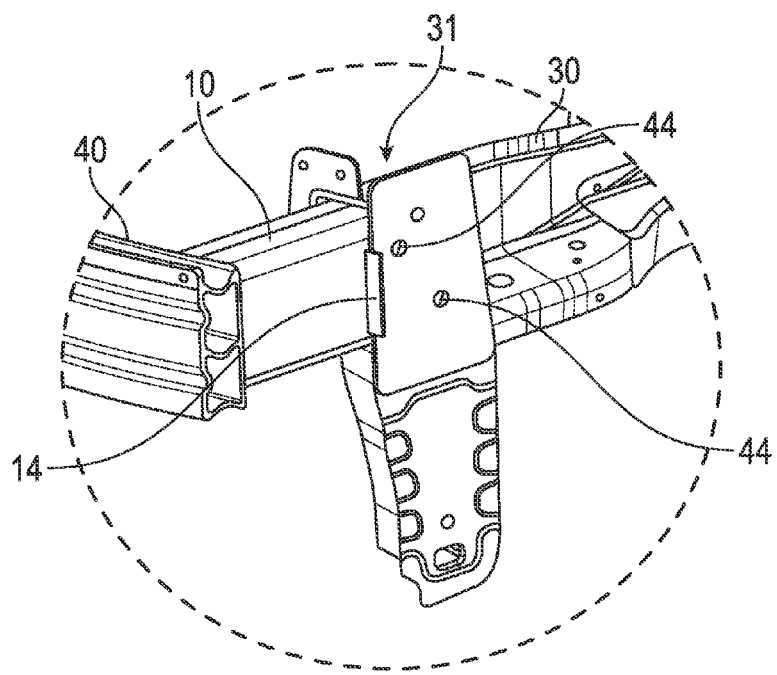
FIG. 2 is an enlarged cut-out illustration of the longitudinal beam structure according to FIG. 1 in the connecting region of crash box and longitudinal beam.
Figure 5:
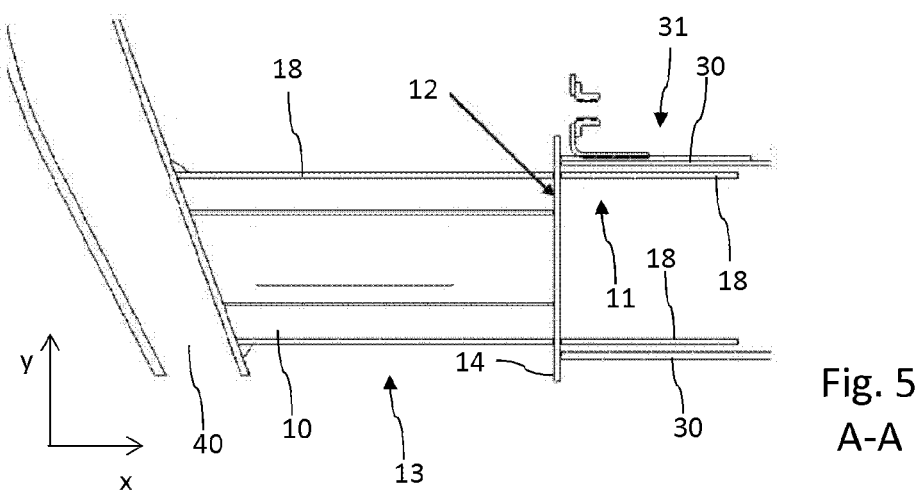
FIG. 5 is a cross-sectional illustration along the section line A-A according to FIG. 3 in the x-y plane.

As further illustration in the enlarged illustration according to FIG. 2, the crash boxes 10 are connected in the manner of a stick-in solution with the longitudinal beam end, or respectively with an end section 33 or respectively with a mount profile 31 of the longitudinal beam 30. The cross-sectional illustration according to FIG. 5 shows that the crash box 10 is able to be introduced with a fastening section 11 into a mount profile 31 of the longitudinal beam 30 on the end side, corresponding hereto, and is able to be connected there detachably with the longitudinal beam 30 respectively on opposite side walls lying in the vehicle transverse direction (y) by means of two fastening screws 44.

Figure 3:
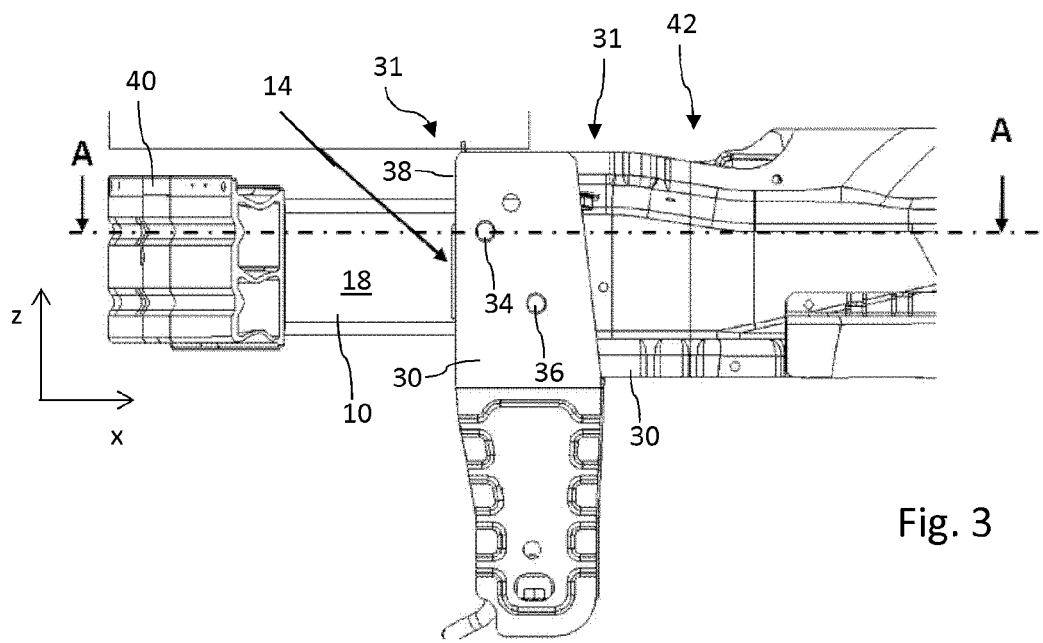
FIG. 3 is a side view of the illustration according to FIG. 2.
Figure 6:
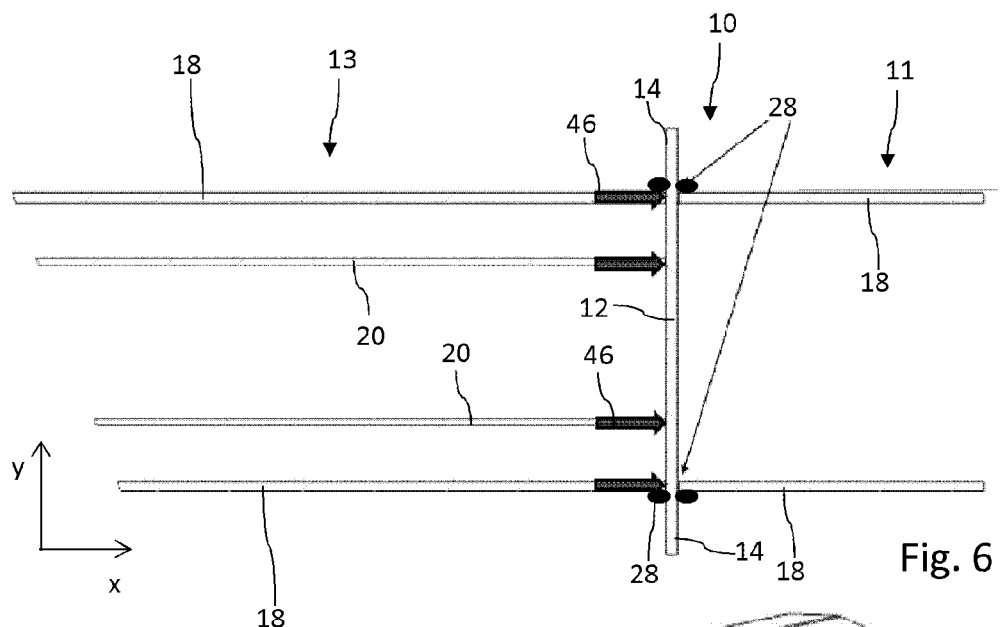
FIG. 6 is a cross-sectional illustration of the crash box in the x-y plane.
Figure 7:
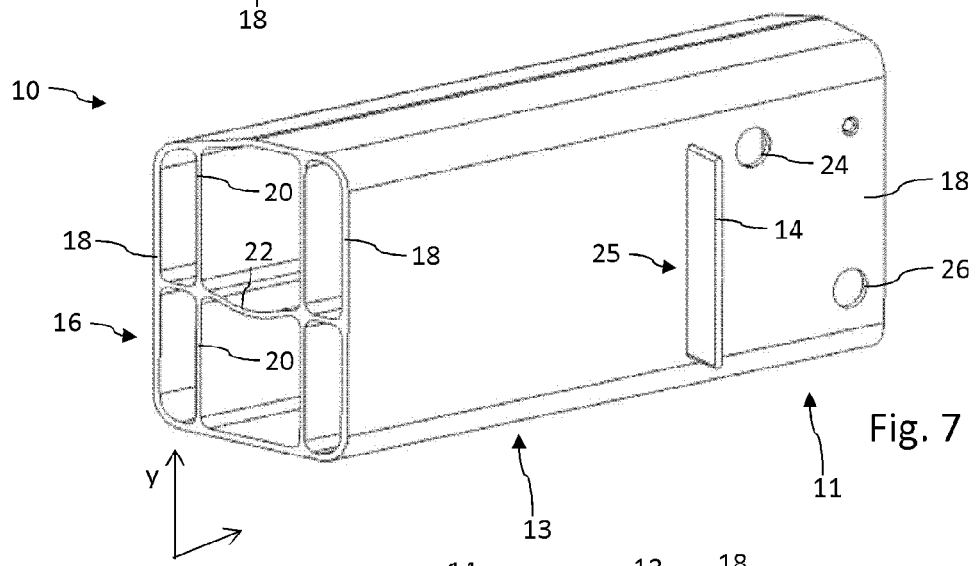
FIG. 7 is an isolated perspective illustration of the crash box provided with a support plate.
Figure 8:
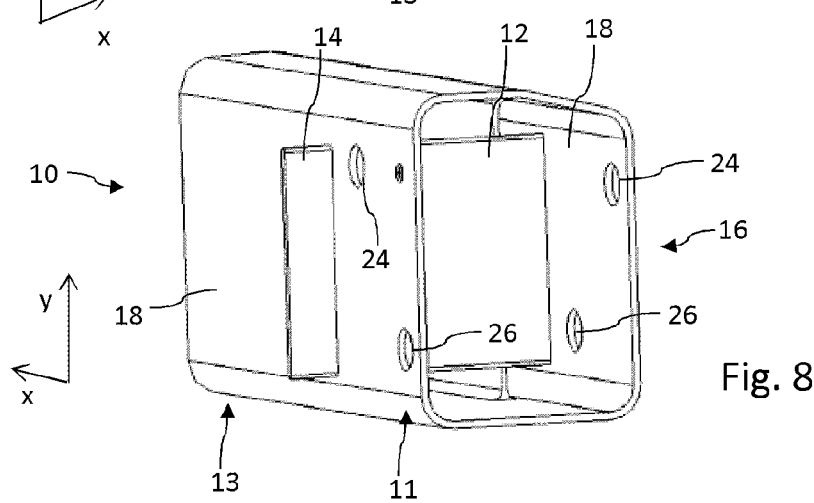
FIG. 8 is a further perspective illustration of the crash box.

The crash box 10, shown in FIGS. 6, 7 and 8 in isolation in cross-section and in perspective illustration, has a single-piece extrusion- or respectively extruded profile, which in the region of a section facing the bumper 40 as energy absorption profile 13 and lying opposite, in assembly configuration lying within the longitudinal beam 30, has a fastening profile 11. In the region of the fastening profile 11, on opposite side walls 18 respectively upper through-openings 24 and lower through-openings 26 are provided, which in the assembly configuration on the longitudinal beam 30, as shown in FIG. 3, with through-openings 34, 36, corresponding hereto and coming to lie in alignment, are arranged in the side wall of the longitudinal beam 30.

For the reciprocal fastening of longitudinal beam 30 and crash box 10, the through-openings 24, 34 and 26 and 36, arranged in alignment to one another, can be respectively penetrated by a fastening element 44, for instance by a screw or by a screw bolt.

The crash box 10 shown in FIGS. 6 to 8 has a continuous side wall 18 or respectively a continuous hollow profile, which in the transition region between the energy absorption profile 13 and the fastening profile 11 has two through-openings 25 constructed in alignment to one another in the profile transverse direction, which are penetrated by a support plate 12. The support plate 12, which is constructed substantially so as to be flat, extends beyond the profile cross-section 16, so that it forms with its end sections, lying in the profile transverse direction, two projections 14 projecting from the profile cross-section 16.

Figure 4:
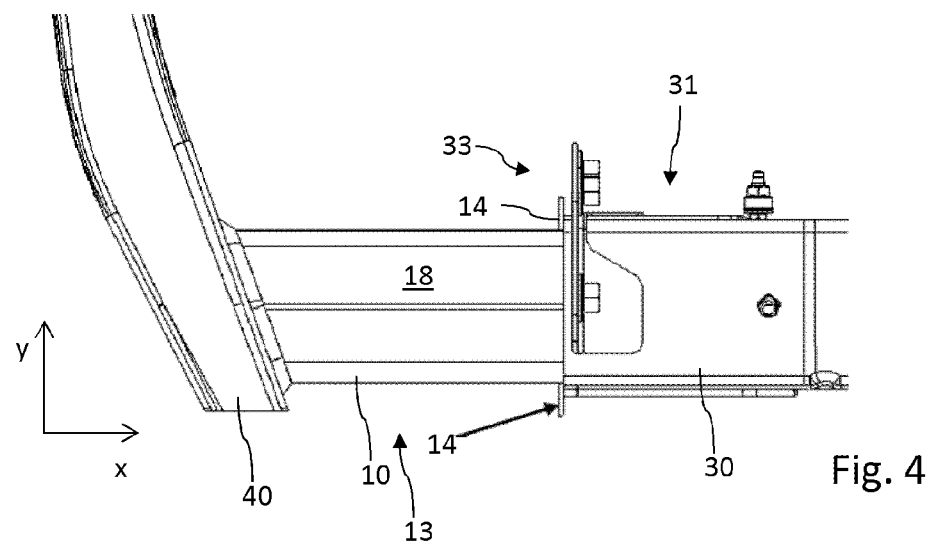
FIG. 4 is a top view onto the connection of crash box and longitudinal beam viewed from above.

In an assembly configuration, as can be seen in FIGS. 2 and 4, those projections 14 also project beyond the cross-section of the end section 33 of the associated longitudinal beam 30, so that by means of the plate-like projections 14 projecting from the profile cross-section 16 of the crash box 10, an abutment position, having a comparatively large area, of crash box 10 and end section 33, can be provided, in one example with a front face 38 of the respectively associated longitudinal beam 30. In this way, any punctual stresses, as may usually occur in the region of the fastening elements 44, can be provided predominantly via the reciprocal abutting position of support plate 12, or respectively its projections 14, at the end section 33 of the longitudinal beam 30.

As further shown in FIG. 8, the support plate 12 extends over more than about 50 percent, even over more than about 75 percent of the interior profile cross-section 16 of the crash box 10. As shown in FIG. 7, the crash box 10 has in one example in its energy absorption profile 13 several inner profile walls 20, 22, which connect the side walls 18 of the crash box 10 in this region in the manner of webs, and in so doing form individual profile chambers. In this way, the energy absorption profile 13 of the crash box 10 can be strengthened and reinforced in a targeted manner, and can be adapted individually to the load-receiving or respectively energy-absorbing requirements.

Such inner profile walls 20, 22 are generally not provided in the region of the fastening profile 11 adjoining the energy absorption profile 13. As shown in FIG. 6, the support plate 12, extending substantially perpendicularly to the profile longitudinal direction (x), is welded to the exterior side walls 18 of the crash box 10 via individual weld points 28. Lying on the interior, the individual profile walls 20, 22 can come into direct abutting position with the support plate 12 without, however, being structurally connected therewith.

In one example, between the inner profile walls 20, 22 and the support plate 12, extending substantially perpendicularly to the profile longitudinal direction (x), a predetermined clearance can be maintained, which facilitates an insertion of the support plate 12 in the profile transverse direction. By means of the support plate 12 and its projections 14 projecting from the profile cross-section, a portion, generally a large portion, of the mechanical load 46 occurring in the case of collision, and sketched in FIG. 6, can be diverted to the end sections 33, in one example to the edges of the adjoining longitudinal beams 30, in a comparable manner to an anchor plate principle. Also, the support plate 12, through its configuration penetrating the cross-section profile 16 of the crash box 10, can also directly receive the load 46 which is able to be transferred from the inner profile walls 20, 22.

A punctual stress in the region of the fastening elements 44 can be hereby reduced. Also, any plastic deformations occurring in these profile sections can be distinctly reduced. In this respect improved introduction of force and support effect between crash box 10 and longitudinal beam 30 can, in addition, bring about a reduction of the distance of the fastening elements 44 and of the through-openings 24, 34 and 26, 36 provided for this. Also, the crash box 10, viewed in the profile longitudinal direction (x), can be constructed so as to be shorter as a whole, and therefore saving more weight.

The provision of a support plate 12 in the case of load can finally counteract a rotational or tilting movement of the crash box with respect to the longitudinal beam. As the through-openings 34, 36 and 24, 26 for the fastening elements 44 are offset to one another both in the profile longitudinal direction (x) and also in the profile vertical direction (z), on occurrence of a mechanical stress a fastening element 44, penetrating the through-openings 24, 34 or the through openings 26, 36, can function as a tilting or rotation axis, which can lead to a shearing or twisting of the crash box 10 with respect to the longitudinal beam 30. By the support plate 12 extending with its outwardly projecting extensions 14 almost over an entire region of the side wall 18 constructed extensively in a straight line, a largely stable and tipping-free reciprocal abutment configuration of crash box 10 and longitudinal beam 30, resistant to tipping or shearing, can be provided.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A crash box for arrangement between a bumper and a longitudinal beam of a motor vehicle body, comprising:
   a fastening profile that is at least partially overlapped by a mount profile of the longitudinal beam when the crash box is coupled to the longitudinal beam; and
   a support element that penetrates the fastening profile transversely to its profile longitudinal direction and is able to be brought to abutment in a supporting manner with an end section of the mount profile;
   wherein the support element is constructed as a support plate, which projects respectively from opposite side walls of the fastening profile with a projection.

2. The crash box according to claim 1, wherein the side walls have through-openings, aligned to one another, to receive the support plate.

3. The crash box according to claim 1, wherein the fastening profile has in the region of at least one side wall at least one through-opening, which in the assembly position on the longitudinal beam comes to lie in alignment to at least one through-opening of the longitudinal beam.

4. The crash box according to claim 1, wherein the support plate lying in the profile cross-section of the fastening profile takes up at least about 50% of the cross-sectional area of the fastening profile.

5. The crash box according to claim 1, wherein the support plate lying in the profile cross-section of the fastening profile takes up at least about 80% of the cross-sectional area of the fastening profile.

6. The crash box according to claim 1, wherein a side wall of the fastening profile continues seamlessly into a side wall of an energy absorption profile adjoining the fastening profile.

7. The crash box according to claim 6, wherein in the region of the energy absorption profile at least one profile wall is provided, connecting side walls with one another which are lying opposite one another.

8. The crash box according to claim 7, wherein the at least one profile wall, viewed in the profile longitudinal direction, adjoins the support plate.

9. The crash box according to claim 7, wherein at least one of the fastening profile and the energy absorption profile are constructed in one piece as an extruded profile, and wherein the fastening profile has a profile cross-section free of profile wall.

10. The crash box according to claim 1, wherein the crash box is constructed as an aluminum extrusion.

11. The crash box according to claim 1, wherein the crash box is manufactured substantially from sheet steel.

12. A motor vehicle body, comprising:
at least one longitudinal beam; and
at least one crash box including a fastening profile, the fastening profile at least partially overlapped by a mount profile of the longitudinal beam when the at least one crash box is coupled to the at least one longitudinal beam and a support element that penetrates the fastening profile transversely to its profile longitudinal direction and is able to be brought to abutment in a supporting manner with an end section of the mount profile,
wherein the support element is constructed as a support plate, which projects respectively from opposite side walls of the fastening profile with a projection.

13. The motor vehicle body according to claim 12, wherein the mount profile of the at least one longitudinal beam and the fastening profile of the at least one crash box have through-openings aligned to one another and penetrated by at least one fastening element.

14. A motor vehicle, comprising:
a motor vehicle body having at least one longitudinal beam with a mount profile;
at least one crash box including a fastening profile, the fastening profile at least partially overlapped by the mount profile of the longitudinal beam when the at least one crash box is coupled to the at least one longitudinal beam and a support element that penetrates the fastening profile transversely to its profile longitudinal direction and is able to be brought to abutment in a supporting manner with an end section of the mount profile,
wherein the mount profile of the at least one longitudinal beam and the fastening profile of the at least one crash box have through-openings aligned to one another and penetrated by at least one fastening element;
wherein the support element is constructed as a support plate, which projects respectively from opposite side walls of the fastening profile with a projection.

15. The motor vehicle according to claim 14, wherein the support plate lying in the profile cross-section of the fastening profile takes up at least about 50% of the cross-sectional area of the fastening profile.

16. The motor vehicle according to claim 14, wherein a side wall of the fastening profile continues seamlessly into a side wall of an energy absorption profile adjoining the fastening profile.

17. The motor vehicle according to claim 16, wherein in the region of the energy absorption profile at least one profile wall is provided, connecting side walls with one another which are lying opposite one another.

18. The crash box according to claim 17, wherein the at least one profile wall, viewed in the profile longitudinal direction, adjoins the support plate.

* * * * *